UNITED STATES PATENT OFFICE.

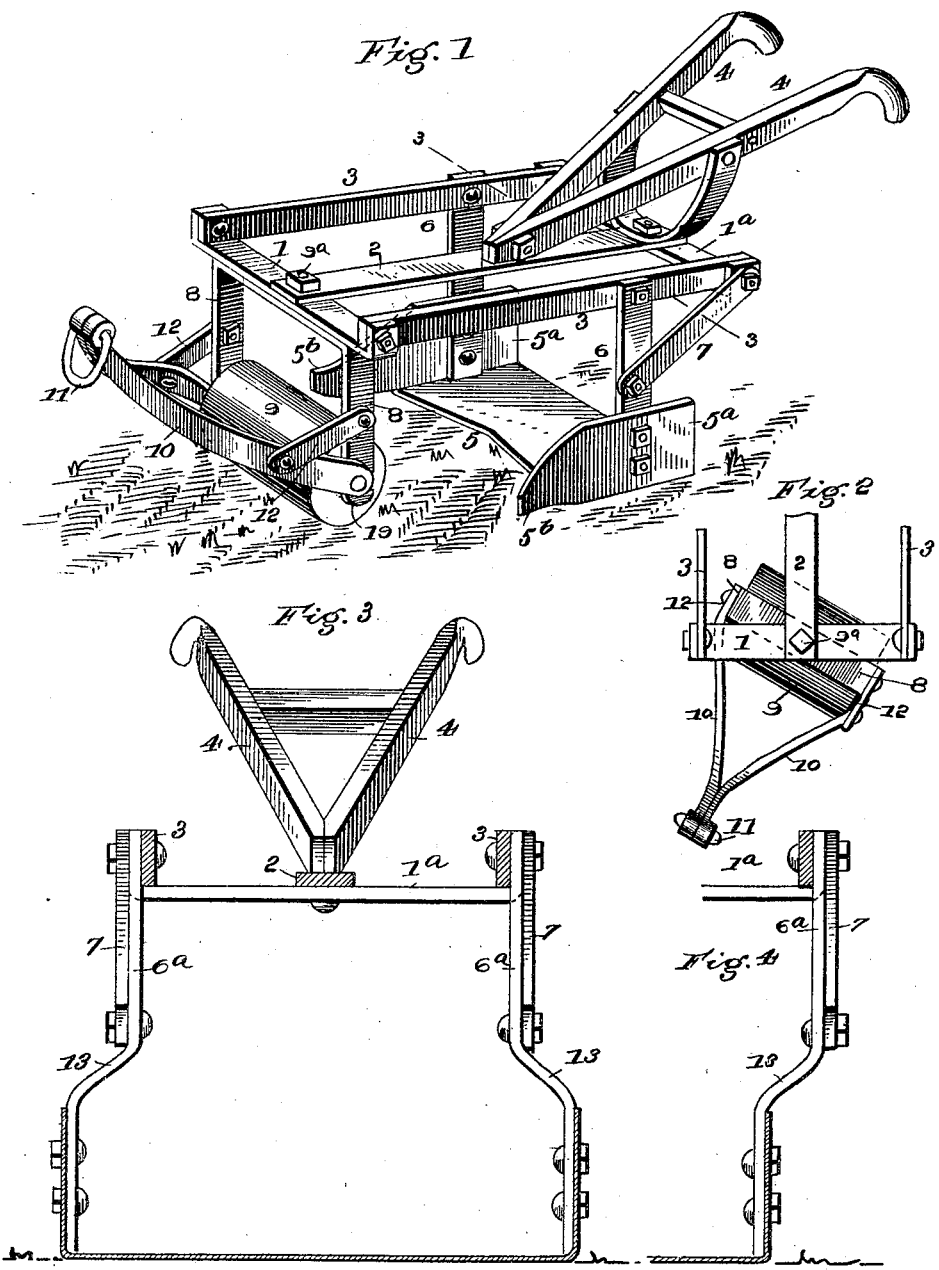

JAMES IVY ROBERTS, OF SPARTA, GEORGIA.

COTTON-CHOPPER.

No. 810,811.  Specification of Letters Patent.  Patented Jan. 23, 1906.

Application filed November 23, 1905. Serial No. 288,721.

*To all whom it may concern:*

Be it known that I, JAMES IVY ROBERTS, a citizen of the United States, and a resident of Sparta, in the county of Hancock and State of Georgia, have made certain new and useful Improvements in Cotton-Choppers, of which the following is a specification.

My invention is an improvement in that class of cotton-choppers which are adapted for use in thinning out rows of cotton-plants, thus leaving a series of stands of such plants duly spaced apart.

The construction, arrangement, and combination of parts are hereinafter described, and illustrated in accompanying drawings, in which—

Figure 1 is a perspective view of the implement. Fig. 2 is a plan view of the front portion of the implement, illustrating the pivotal or swiveled attachment of the draft appliance and front roller. Fig. 3 is a vertical cross-section on the line 3 3 of Fig. 1. Fig. 4 is a vertical section illustrating a reversed arrangement of a portion of the implement.

The skeleton frame of the implement is rectangular and oblong and composed of front and rear cross-bars 1 1$^a$, having upturned ends, a central longitudinal bar 2, attached to the said cross-bars, and parallel longitudinal side bars 3, which are bolted to the upturned ends of the cross-bars. Rearwardly-projecting handles 4 are attached to the central bar 2 for use in guiding and lifting the rear portion of the implement.

A broad cutting-blade 5, having vertical integral side portions or wings 5$^a$, is attached to pendent bars 6, whose upper ends are bolted to the side bars 3 of the frame at points about midway between the rear end and the middle of the frame. These bars 6 are provided with diagonal rear braces 7. The blade 5 is constructed of thin sheet-steel, and the vertical side pieces or wings 5 5$^a$ have their front ends 5$^b$ outturned, for a purpose that will be presently explained.

A yoke 8, formed of a bar having pendent parallel end portions and a horizontal top portion, is pivoted at 9$^a$ to the center of the front cross-bar 1, the pivot-bolt serving also to secure the front end of the longitudinal frame-bar 2. A roller 9 is journaled in the lower ends of the pendent yoke-bars, and draft-bars 10 are attached to the journals of the roller and extend forward and upward at an angle of thirty-five to forty-five degrees, their ends converging and being connected by a draft-link 11, to which in practice the team is attached. Connecting-bars 12 extend between the pendent portions of the yoke 8 and the draft-bars 10 and serve to support the same at the desired angle and also rigidly connect them with the yoke, so that the draft strain is practically applied to the upper portion of the yoke, and thereby to the frame of the implement. The roller 9 is constructed solid and preferably of cast-iron, so that it has considerable weight—namely, thirty-five or forty pounds. It is constructed shorter than the space between the pendent side bars 6, which support the blade 5.

In Figs. 3 and 4 I illustrate a preferred construction of vertical bars 6$^a$, to which the cutter is attached—that is to say, since it is often desired to vary the width of cut made through a cotton-row, so as to leave stands of the cotton-plants at different distances apart, I construct the machine so that it may be adapted for this purpose—that is to say, for attachment of cutting-blades of different lengths. To this end the pendent bars are constructed with a lateral bend or offset, as indicated at 13 in Figs. 3 and 4, the bend being located at a point just below the braces 7 and above the side wings of the cutter. Thus if the bars 6$^a$ be arranged, as shown in Fig. 3, with the lateral bends 13 extending outward a cutter of maximum width may be employed, whereas if the lateral bends 13 be projected inward instead of outward, as shown in Fig. 4, a much shorter blade or cutter may be employed. It is apparent that by removing two bolts on each side of the machine the bars 6$^a$ may be detached from the main frame and the braces 7, and by detaching the two bolts which secure the blade to the bars the latter may be reversed to place the lateral bends 13 outward or inward, as illustrated and above described.

In the practical use of the implement it is drawn across the parallel contiguous rows of cotton-plants in a direction at right angles, and in this operation the roller 9 follows the team and also the blade 5; but the latter is steadied and pressed down to the required degree to cause it to take under the plants which are to be cut out, the handles 4 serving for this purpose, as well as means for shifting the rear portion of the frame, together with the blade 5, laterally, as occasion may require, to avoid any obstruction or to leave standing any particular portion of the plants which judgment may dictate. It will be seen that the outturned ends 5ᵇ of the side wings 5ᵃ tend to guide the soil inward, and hence none is thrown outward upon the plants left standing. The heavy roller 9 not only serves to support the front portion of the frame and more than half of the weight of the same, but also crushes clods and depresses plants and weeds in advance of the cutter, so that they may be more easily uprooted or cut out.

While the implement is particularly designed and adapted for use as a cotton-chopper proper, it is manifest that it has a wider application of use, since it may be employed for scraping the surface of a cultivated field for removing small weeds and leaving fresh soil exposed, as is sometimes required in cultivating certain crops.

Having thus described my invention, what I claim as new, and desire to secure by Letters Patent, is—

1. The improved cotton-chopper comprising a rigid horizontal frame having rearwardly-projecting handles, a front roller and a draft attachment comprising a frame pivoted to the main frame and having forwardly-extended converging draft-bars and connected therewith, pendent side bars attached to the rear portions of the main frame and having lateral bends, and a cutting-blade attached to the lower ends of such bars and comprising a horizontal portion and vertical side wings having outturned front ends, substantially as described.

2. In a cotton-chopper the combination with the main frame, pendent bars attached thereto, a cutting-blade connecting the lower ends of such bars and having vertical side wings, a front supporting and draft attachment comprising a yoke which is pivoted centrally to the front bar of said frame, a roller journaled in the pendent portions of such yoke and draft-bars proper rigidly connected with the yoke and converging at their front ends and extending upward at an angle of about forty-five degrees, substantially as described.

3. In a cotton-chopper the combination with a main frame and a front draft attachment comprising a roller and a pivoted frame in which it is journaled, of a cutting-blade arranged horizontally and pendent bars to which the same is attached, the said bars having a lateral bend intermediate of the blade and the frame and means for securing the bars detachably to both the frame and blade whereby they are adapted for convenient detachment and reversal of their bent portions whereby they are adapted for use with blades of varying widths, substantially as described.

4. The improved cultivating implement comprising an oblong rectangular frame provided with rearwardly-projecting handles, a rear cutting attachment comprising a horizontal blade having vertical side wings and rigid bars connecting such blade with the frame, and a front draft and supporting attachment comprising a roller, a yoke in which the roller is journaled, the same being pivoted to the front portion of the main frame and draft-bars rigidly connected with such yoke and extending forward and upward and converging as shown and described.

JAMES IVY ROBERTS.

Witnesses:
R. B. BAXTER,
L. C. CULVER.